(12) United States Patent
Chen

(10) Patent No.: US 8,797,483 B2
(45) Date of Patent: Aug. 5, 2014

(54) MANUFACTURING METHODS OF PHASE RETARDATION FILM AND STEREOSCOPIC DISPLAY DEVICE

(75) Inventor: Chia-Tai Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 123 days.

(21) Appl. No.: 13/113,072

(22) Filed: May 22, 2011

(65) Prior Publication Data

US 2012/0242949 A1    Sep. 27, 2012

(30) Foreign Application Priority Data

Mar. 21, 2011  (CN) .......................... 2011 1 0071643

(51) Int. Cl.
*G02F 1/1335*  (2006.01)
*G02F 1/1337*  (2006.01)
*G02B 5/30*    (2006.01)
*G02B 27/26*   (2006.01)

(52) U.S. Cl.
CPC .............. *G02B 27/26* (2013.01); *G02B 5/3083* (2013.01)
USPC .............. 349/117; 349/15; 349/123; 349/129

(58) Field of Classification Search
USPC .......................................................... 349/15
See application file for complete search history.

(56) References Cited

U.S. PATENT DOCUMENTS

| | | | |
|---|---|---|---|
| 5,844,717 A | 12/1998 | Faris | |
| 6,055,103 A * | 4/2000 | Woodgate et al. | 359/489.07 |
| 6,384,971 B1 * | 5/2002 | Faris | 359/486.02 |
| 6,735,017 B1 | 5/2004 | Acosta et al. | |
| 2001/0020984 A1 * | 9/2001 | Umemoto | 349/1 |
| 2004/0239835 A1 * | 12/2004 | Jung | 349/96 |

FOREIGN PATENT DOCUMENTS

| | | |
|---|---|---|
| CN | 1412612 A | 4/2003 |
| CN | 101452173 | 6/2009 |
| CN | 101910889 | 12/2010 |
| CN | 101943800 A | 1/2011 |
| JP | 2001166299 | 6/2001 |

OTHER PUBLICATIONS

Article Titled "The Fabrication of Microretarder for In-cell Stereoscopic LCD using Reactive Liquid Crystal" jointly authored by Tseng et al., in SPIE-IS&T, vol. 6490, Jul. 6, 2007 (pp. 1-8).
Article Titled "Fabricating Polymeric Micro-retardation Arrays for Autostereoscopic Display System by CO2 Laser Heat Processing Technology" jointly authored by Tsai et al., in SPIE, vol. 3957, 2000 (pp. 142-152).

(Continued)

*Primary Examiner* — Wen-Ying P Chen
(74) *Attorney, Agent, or Firm* — Jianq Chyun IP Office

(57) ABSTRACT

A manufacturing method of a phase retarding film, a manufacturing method of a stereoscopic display apparatus, and a phase retarding film are provided. A light transmissive substrate is provided. An alignment layer is formed on the light-transmissive substrate. The alignment layer is aligned. A birefringent material film is formed on the alignment layer. A reaction-causing light is used to expose a first patterned region of the birefringent material film to induce a reaction on the first patterned region, wherein a second patterned region of the biregringent material film is not exposed to the reaction-causing light. The second patterned region of the biregringent material film is removed.

19 Claims, 3 Drawing Sheets

(56) References Cited

OTHER PUBLICATIONS

Article Titled "Novel High Performance Transflective LCD with a Patterned Retarder" jointly authored by Roosendaal et al., in SID 03 Digest, 2003 (pp. 78-81).

"Office Action of China Counterpart Application", issued on Aug. 1, 2013, p. 1-p. 10.

"Office Action of China Counterpart Application", issued on Apr. 23, 2014, pp. 1-8.

* cited by examiner

MANUFACTURING METHODS OF PHASE RETARDATION FILM AND STEREOSCOPIC DISPLAY DEVICE

CROSS-REFERENCE TO RELATED APPLICATION

This application claims the priority benefit of China application serial no. 201110071643.1, filed Mar. 21, 2011. The entirety of the above-mentioned patent application is hereby incorporated by reference herein and made a part of this specification.

TECHNICAL FIELD

The disclosure relates to a phase retardation film, a manufacturing method of a phase retardation film, and a manufacturing method of a stereoscopic display device.

BACKGROUND

The year of 2010 has been internationally established as the year of stereoscopic display. According to statistical prediction, the global stereoscopic display market will increase 95% each year in the future. Accordingly, display manufacturers successively enter the market of stereoscopic display. Due to such a demand, flat display device has entered another era, which is the era of stereoscopic display.

A stereoscopic display may realistically show an image desired to be conveyed, as a natural image being viewed by the eyes of a human being. Conventionally, a stereoscopic display applies an exteriorly mounted micro-phase retardation film, formed with a special polymer material. The micro-phase retardation film is attached to the glass of the exterior of a liquid crystal screen. When a light signal image passes through the liquid crystal switch of the display device and the attached micro-phase retardation film, a phase change is generated. Accordingly, after being filtered by polarized glasses, two different types of image information are formed and are respectively provided for the viewing of the left and right eyes. Due to the innate parallax phenomenon of human beings, two dissimilar images ultimately form a stereoscopic image in the brain.

A stereoscopic display device can be differentiated into the glasses-wearing type and the auto-stereoscopic type, wherein each type of stereoscopic display device has its advantages and disadvantages, and appropriate applications. The exterior-attached micro-phase retardation film method may be applied to the glasses-wearing type of stereoscopic display device. However, the fabrication method of a micro-phase retardation film typically requires two or more photomask processes. Hence, the manufacturing process is more complicated, and the fabrication cost and time can not be effectively lowered.

SUMMARY

An exemplary embodiment of the disclosure provides a manufacturing method of a phase retardation film, and the manufacturing method comprises at least the following steps. A light-transmissive substrate is provided. An alignment layer is formed on the light-transmissive substrate. The alignment layer is aligned. A birefringent material film is formed on the alignment layer. Using a first patterned region of the birefringent material film is exposed by a reaction-causing light so that a reaction of the first patterned region is induced, wherein a second patterned region of the birefringent material film is obviated from being exposed by the reaction-causing light. The second patterned region of the birefringent material film is removed.

An exemplary embodiment of the disclosure provides a manufacturing method of a stereoscopic display device in which the above steps in the manufacturing of a phase retardation film are comprised. Further, the light-transmissive substrate along with the alignment layer and the first pattered region is disposed on the display device, wherein the image light emitted by the display device is polarized.

An exemplary embodiment of the disclosure provides a phase retardation film, wherein the phase retardation film consists essentially of a light-transmissive substrate, an alignment layer, and a patterned birefringent material film. The alignment layer is disposed on the light-transmissive substrate, and the alignment layer has a single directionality. The patterned birefringent material film is disposed on the alignment layer and is aligned by the alignment function of the alignment layer. The patterned birefringent material film covers a portion of the alignment layer.

Several exemplary embodiments accompanied with figures are described in detail below to further describe the disclosure in details.

BRIEF DESCRIPTION OF THE DRAWINGS

The accompanying drawings are comprised to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
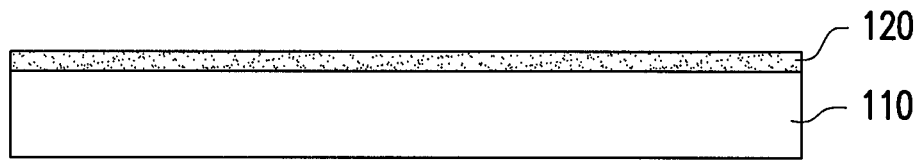
FIGS. 1A to 1F are schematic diagrams showing the steps of a manufacturing method for a phase retardation film according to an exemplary embodiment.

FIGS. 1A to 1F are schematic diagrams showing the steps of a manufacturing method for a phase retardation film according to an exemplary embodiment. The manufacturing method of a phase retardation film according to an exemplary embodiment comprises at the least the following steps. As shown in FIG. 1A, a light-transmissive substrate 110 is provided. In this exemplary embodiment, the light-transmissive substrate 110 is, for example, a transparent substrate, such as a glass substrate. However, in the other exemplary embodiments, the light-transmissive substrate may be constructed with other materials.

Thereafter, an alignment layer 120 is formed on the light-transmissive substrate 110. In this exemplary embodiment, the material of the alignment layer 120 comprises polyimide, for example. More specifically, a layer of polyimide alignment liquid is spin-coated on the light-transmissive substrate 110. Other approaches may also be applied to coat the polyimide alignment liquid. Thereafter, the alignment liquid is heated and cured to form the alignment layer 120.

Figure 1B:
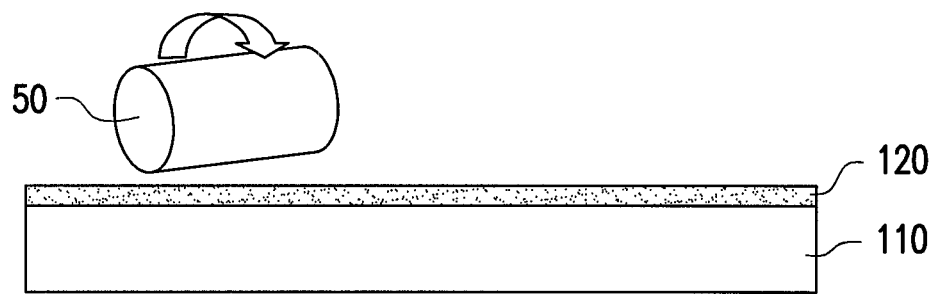

Referring to FIG. 1B, the alignment layer 120 is aligned. In this exemplary embodiment, the method of aligning the alignment layer 120 comprises, for example, a rubbing alignment method, in which a roller 50 having fine hair thereon is applied to roll and sweep the surface of the alignment layer 120. In this exemplary embodiment, as the roller 50 sweeps the alignment layer 120, the rolling direction of the roller 50 maintains substantially unchanged. Hence, the alignment layer 120 may be aligned along a single direction. However, in other exemplary embodiments, the alignment layer 120 may be aligned by an optical alignment method, wherein when light irradiates the alignment layer 120 in a particular direction, the alignment layer 120 is also aligned along a single direction.

Figure 1C:
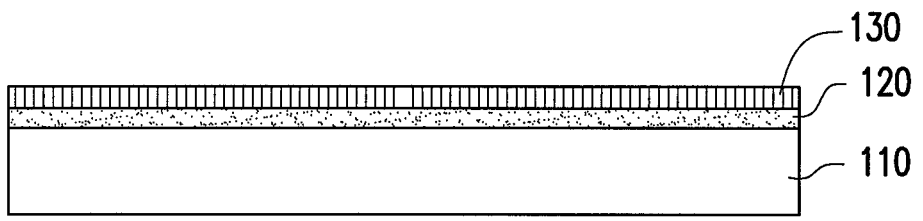
Figure 1D:
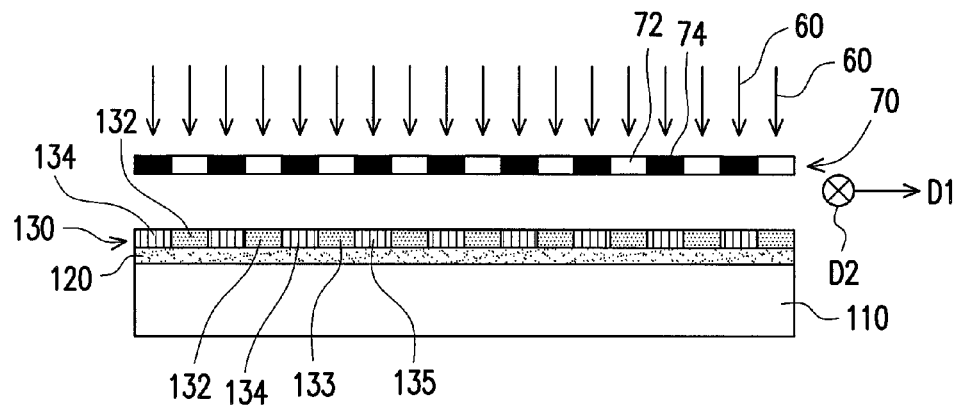

Thereafter, as shown in FIG. 1C, a birefringent material film 130 is formed on the alignment layer 120. In this exemplary embodiment, the birefringent material film 130 is a reactive mesogen material film, for example. Then, as shown in FIG. 1D, a reaction-causing light 60 is used to expose to the first patterned region 132 of the birefringent material film 130 so as to generate a reaction, while the second patterned region 134 is not exposed by reaction-causing light 60. More particularly, in the current exemplary embodiment, the reaction-causing light 60 is an ultraviolet light, for example. The reaction-causing light 60 may be emitted from a light source. Further, a photomask 70 may be disposed between the birefringent material film 130 and the above light source, wherein the photomask 70 comprises a patterned light-transmissive region 72 and a patterned light-shielding region 74. The reaction-causing light 60 penetrates the patterned light-transmissive region 72 and irradiates the first patterned region 132, such that an exposure reaction is generated in the first patterned region 132. On the other hand, the patterned light-shielding region 74 shields the reaction-causing light 60 from irradiating the second patterned region 134. Accordingly, the second patterned region 134 is not exposed.

In this exemplary embodiment, the first patterned region 132 comprises a plurality of mutually separated, first strip-shaped regions 133, and the second patterned region 134 comprises a plurality of mutually separated, second strip-shaped regions 135. The first strip-shaped regions 133 and the second strip-shaped regions 135 are alternately arranged on the light-transmissive substrate 110. More specifically, each of the first strip-shaped regions 133 extends along a second direction D2, and each of the second strip-shaped regions 135 also extends along the second direction D2, while the first strip-shaped regions 133 and the second strip-shaped regions 135 alternately arranged in the first direction D1. In this exemplary embodiment, the first direction D1 is substantially perpendicular to the second direction D2.

Further, in this exemplary embodiment, using the reaction-causing light 60 to expose and to induce a reaction on the first patterned region 132 of the birefringent material film 130 is basically using the reaction-causing light 60 to expose and cure the first patterned region 132. In other words, the reactive mesogen material adopted for the birefringent material film 130 is a photocuring material.

Figure 1E:
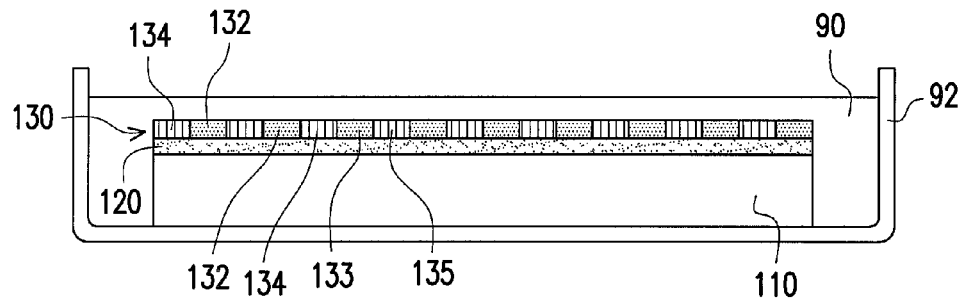
Figure 1F:
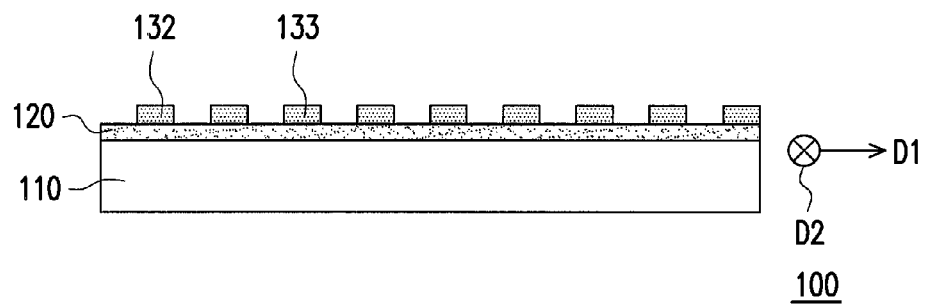

Continuing to FIG. 1E, the second patterned region 134 of the birefringent material film 130 is then removed. In this exemplary embodiment, the second patterned region 134 of the birefringent material film 130 is removed by performing a wet etching process on the second patterned region 134. More specifically, the wet etching process is performed by submerging the light-transmissive substrate 110 along with the alignment layer 120, the exposed first patterned region 132, and the unexposed second patterned region 134 in an alcohol solvent 90 or other type of solvent to remove the second patterned region 134 from the light-transmissive substrate 110. For example, the light-transmissive substrate 110 along with the alignment layer 120, the exposed first patterned region 132, and the unexposed second patterned region 134 is placed in a container 92 containing an alcohol solvent 90 and is soaked in the alcohol solvent 90. However, in other exemplary embodiments, removing the second patterned region 134 of the birefringent material film 130 may be accomplished by performing drying etching on the second patterned region 134 to remove the second patterned region 134. Referring to FIG. 1F, after the second patterned region 134 is removed, the phase retardation film 100 of this exemplary embodiment is completed.

In this exemplary embodiment, the phase retardation film 100 comprises a light-transmissive substrate 110, an alignment layer 120, a patterned birefringent material film (which is the above-mentioned first patterned region 132), wherein the alignment layer 120 is disposed on the light-transmissive substrate 110. In this exemplary embodiment, the alignment layer 120 has a single directionality, and the patterned birefringent material film (which is the first patterned region 132) is disposed on the alignment layer 120 and is aligned by the alignment function of the alignment layer 120. Further, the patterned birefringent material covers a portion of the alignment layer 120. In this exemplary embodiment, the patterned birefringent material comprises photo-cured reactive mesogen material. Furthermore, the patterned birefringent material (the above-mentioned first patterned region 132) comprises a plurality of strip-shaped regions (the above-mentioned first strip-shaped regions 133). These strip-shaped regions (the above-mentioned first strip-shaped regions 133) are configured along the first direction D1 and spaced apart, and each first strip-shaped region (the above-mentioned first strip-shaped region 133) extends along the second direction D2.

Figure 2:
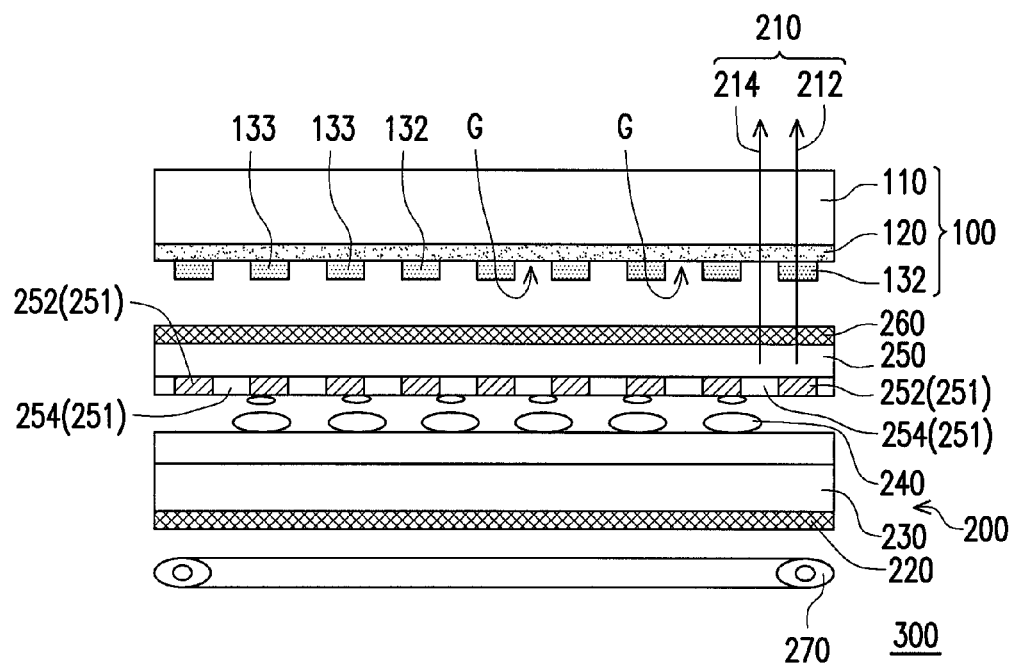
FIG. 2 is a schematic diagram showing a manufacturing method of a stereoscopic display device according an exemplary embodiment.

FIG. 2 is a schematic diagram showing a manufacturing method of a stereoscopic display device according an exemplary embodiment. Referring to FIG. 2, the manufacturing method of a stereoscopic display device of this exemplary embodiment comprises the above manufacturing steps of a phase retardation film 100. Moreover, the manufacturing method of a stereoscopic display device of this exemplary embodiment also comprises disposing the phase retardation film 100 on a display device 200. Alternatively speaking, the light-transmissive substrate 110, along with the alignment layer 120 and the first patterned region 132, is disposed on the display device 200, wherein an image light 210 emitted by the display device 200 is polarized. Accordingly, the fabrication of a stereoscopic display device 300 of this exemplary embodiment is completed.

In this exemplary embodiment, the display device 200 is a liquid crystal display device, which comprises a back light module 270, a first polarizer 220, an active device array substrate 230 such as a thin film transistor array substrate, and an opposite substrate 250 such as a color filter substrate disposed in sequence. In this exemplary embodiment, the opposite substrate 250 comprises a plurality of pixels 251 and these pixels 251 may be separated into two groups, which are the pixels 252 and the pixels 254. The pixels 252 correspond to the first patterned region 132, while the pixels 254 correspond to the original position of the removed second patterned region 134. In other words, the pixels 254 correspond to the gap G between two adjacent first strip-shaped regions 133 of the first patterned region 132. A first part image light 212 from the pixels 252 and through the second polarizer 260 is linearly polarized. Further, through the adjustment of the thickness of the first patterned region 132, the first patterned region 132 forms a half-wave plate. Alternatively speaking, the first patterned region 132 has a phase retardation effect of half wavelength. Moreover, the fast axis of the half-wave plate and the linear polarization direction of the first part image light 212 from the second polarizer 260 substantially form a 45-degree included angle. As such, after the first part image light 212 passes through the first patterned region 132, the linear polarization direction of the first part image light 212 is rotated by 90 degrees. On the other hand, the second part image light 214 from the pixels 254 and through the second polarizer 260 is linearly polarized, and after the second part image light 214 passes through the gap G, its linear polarization direction is unchanged. In other words, there is a 90-degree difference between the linear polarization direction of the first part image light 212 that passes through the first patterned region 132 and the linear polarization direction of the second part image light 214 that passes through the gap G. Accordingly, the pixels 252 display one of the left-eye and right-eye images, while the pixels 254 display another one of the left-eye and right-eye images. A user who is wearing a polarized glasses, which comprises a right-eye polarized lens and a left-eye polarized lens having transmission axes different in 90 degrees, can view the stereoscopic image displayed by the stereoscopic display device.

According to the manufacturing methods of a phase retardation film and the manufacturing method of a stereoscopic display device of these exemplary embodiments of the disclosure, a single photomask process may be applied to complete the phase retardation film; hence, the manufacturing method of a phase retardation film and the manufacturing method of a stereoscopic display device are simplified. Further, the manufacturing cost and time are effectively reduced. Moreover, a high temperature process can be obviated. Additionally, the gap G is formed after the removal of the second patterned region 134, so that the positioning of the first patterned region 132 and the gap G is precise. In another exemplary embodiment, the photomask process is not applied to expose the first patterned region 132. Instead, a laser light source may apply to scan the first patterned region 132 and not the second patterned region 134 in order to expose the first patterned region 132. Accordingly, a single exposure process is performed; hence, a simple manufacturing process is resulted, and the manufacturing time and cost are effectively reduced. Moreover, the structure of the phase retardation film 100 of the exemplary embodiment is simple; the manufacturing cost is thereby lower.

In another exemplary embodiment, the display device 200 may be an organic light emitting diode display (OLED display), a plasma display panel, a cathode ray tube or other appropriate display devices having a polarizer film disposed on a display panel.

Figure 3:
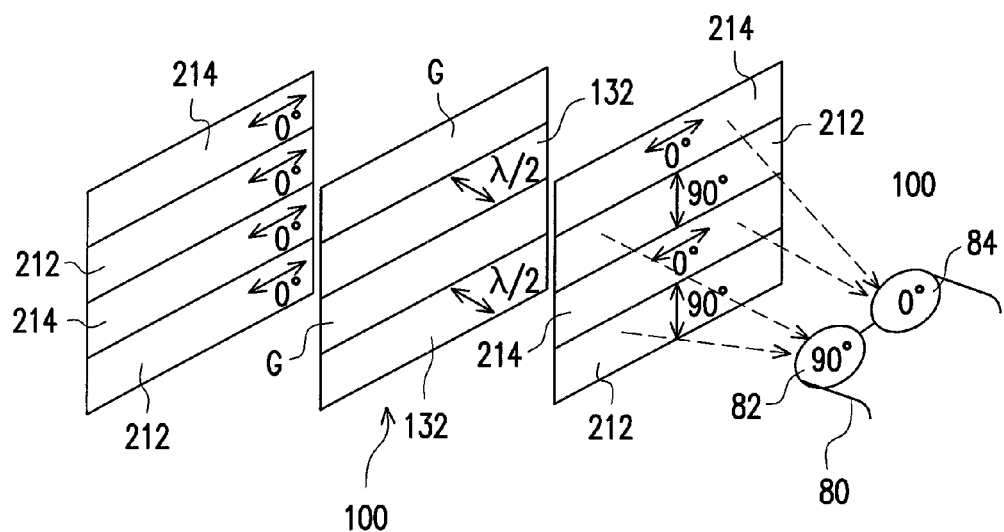
FIG. 3 is a schematic diagram showing the stereoscopic display device of FIG. 2 displaying the stereoscopic image.

The following exemplary embodiment illustrates the liner polarization direction of the image light at the different stages, the direction of the phase retardation film, and polarization direction of the polarized glasses worn by a user. The exemplary embodiment is only used as an illustration and should by no means be used to limit the scope of the disclosure. FIG. 3 is a schematic diagram showing the stereoscopic display device of FIG. 2 displaying the stereoscopic image. Referring to both FIGS. 2 and 3, the image light 210 just emitted from the display device 200 is distributed as the quadrilateral shown at the leftmost side in FIG. 3, wherein the linear polarization directions of the first part image light 212 and the second part image light 214 are 0 degree, for example. Then, the image light 212 passes through the phase retardation film 100. The first patterned region 132 is, for example, a half-wave plate, and the fast axis direction thereof and the liner polarization direction of the just emitted image light 210 forms a 45-degree included angle, for example. Accordingly, after the image light 210 passes through the phase retardation film 100, the first part image light 212 has a 90-degree linear polarization direction due to its passage through the first patterned region 132, while the second part image light 214 has a 0-degree linear polarization direction due to its passage through the gap G, as in the quadrilateral shown at the rightmost side in FIG. 3. The transmission axis of the left-eye polarized lens of the polarized glasses 80 worn by a user is set at a 90-degree direction, for example; while the transmission axis of the right-eye polarized lens 84 of the polarized glasses 80 is set at a 0-degree direction. Accordingly, the left eye of the user sees the first part image light 212, but not the second part image light 214. Whereas the right eye of the user sees the second part image light 214, but not the first part image light 212. Therefore, if the first part image light 212 comprises the information of the left-eye image and the second part image light 214 comprises the information of the right-eye image, the user can view a stereoscopic image.

According to the manufacturing method of a phase retardation film and the manufacturing method of a stereoscopic display device of the exemplary embodiments of the disclosure, a single photomask process may be used to complete the phase retardation film. Hence, the manufacturing method of a phase retardation film and the manufacturing method of a stereoscopic display device are simplified, and the manufacturing cost and time are effectively reduced. Moreover, a high temperature process can be obviated. Additionally, the gap is formed after the removal of the second patterned region, so that the positioning of the first patterned region and the gap are precise. In another exemplary embodiment, the photomask process may not be used to expose the first patterned region. Instead, a laser light source may be applied to scan the first patterned region and not the second patterned region in order to expose the first patterned region. Accordingly, a single exposure process is performed; hence, a simple manufacturing process is resulted, and the manufacturing time and cost are also effectively reduced. Moreover, the structure of the phase retardation film of the exemplary embodiment is simpler; the manufacturing cost is thereby lower.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A manufacturing method of a phase retardation film, the manufacturing method comprising:
   providing a light-transmissive substrate;
   forming an alignment layer on the light-transmissive substrate;
   aligning the alignment layer;
   forming a birefringent material film on the alignment layer;
   exposing and inducing a reaction on a first patterned region of the birefringent material film by a reaction-causing light, wherein a second patterned region of the birefringent material film is not exposed by the reaction-causing light; and
   etching the second patterned region of the birefringent material film by an etchant, wherein the first patterned region is solidified to a degree that the solidified first patterned region resists the etchant and is not etched by the etchant.

2. The manufacturing method of claim 1, wherein the alignment layer is aligned by performing a rubbing alignment method.

3. The manufacturing method of claim 1, wherein the alignment layer is aligned by performing an optical alignment method.

4. The manufacturing method of claim 1, wherein the alignment layer is aligned along a single direction.

5. The manufacturing method of claim 1, wherein the birefringent material film comprises a reactive mesogen material film.

6. The manufacturing method of claim 1, wherein the step of etching the second patterned region of the birefringent material film by the etchant comprises performing a wet etching process on the second patterned region.

7. The manufacturing method of claim 6, wherein the wet etching process comprises soaking the light-transmissive substrate, the alignment layer, the exposed first patterned region, and the unexposed second patterned region in an alcohol solvent.

8. The manufacturing method of claim 1, wherein the step of etching the second patterned region of the birefringent material film by the etchant comprises performing a dry etching process on the second patterned region.

9. The manufacturing method of claim 1, wherein the first patterned region comprises a plurality of first strip-shaped regions separate from each other, and the second patterned region comprises a plurality of second strip-shaped regions separate from each other, and the plurality of first strip-shaped regions and the plurality of the second strip-shaped regions are alternately arranged on the light-transmissive substrate.

10. A manufacturing method of a stereoscopic display device, the manufacturing method comprising:
    providing a light-transmissive substrate;
    forming an alignment layer on the light-transmissive substrate;
    aligning the alignment layer;
    forming a birefringent material film on the alignment layer;
    exposing and inducing a reaction on a first patterned region of the birefringent material film by a reaction-causing light, wherein a second patterned region of the birefringent material film is not exposed by the reaction-causing light;
    etching the second patterned region of the birefringent material film by an etchant, wherein the first patterned region is solidified to a degree that the solidified first patterned region resists the etchant and is not etched by the etchant; and
    disposing the light-transmissive substrate with the alignment layer and the first patterned region on a display device, wherein an image light emitted from the display device is polarized.

11. The manufacturing method of claim 10, wherein the alignment layer is aligned by performing a rubbing alignment method.

12. The manufacturing method of claim 10, wherein the alignment layer is aligned by performing an optical alignment method.

13. The manufacturing method of claim 10, wherein the alignment layer is aligned along a single direction.

14. The manufacturing method of claim 10, wherein the birefringent material film comprises a reactive mesogen material film.

15. The manufacturing method of claim 10, wherein the step of etching the second patterned region of the birefringent material film by the etchant comprises performing a wet etching process on the second patterned region.

16. The manufacturing method of claim 15, wherein the wet etching process comprises soaking the light-transmissive substrate, the alignment layer, the exposed first patterned region, and the unexposed second patterned region in an alcohol solvent.

17. The manufacturing method of claim 10, wherein the step of etching the second patterned region of the birefringent material film by the etchant comprises performing a dry etching process on the second patterned region.

18. The manufacturing method of claim 10, wherein the first patterned region comprises a plurality of first strip-shaped regions separate from each other, and the second patterned region comprises a plurality of second strip-shaped regions separate from each other, and the plurality of first strip-shaped regions and the plurality of the second strip-shaped regions are alternately arranged on the light-transmissive substrate.

19. The manufacturing method of claim 10, wherein after disposing the light-transmissive substrate with the alignment layer and the first patterned region on a display device, the first patterned region is located between the alignment layer and the display device.

* * * * *